(No Model.)
B. W. BEACH.
WEAR PLATE FOR VEHICLES.
No. 365,960. Patented July 5, 1887.
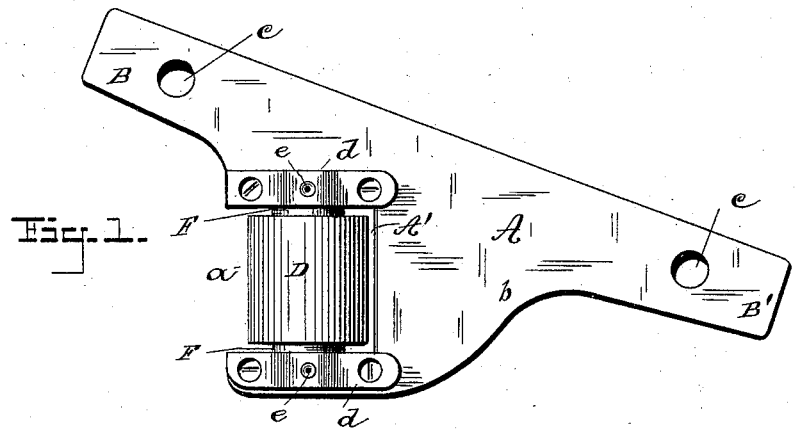
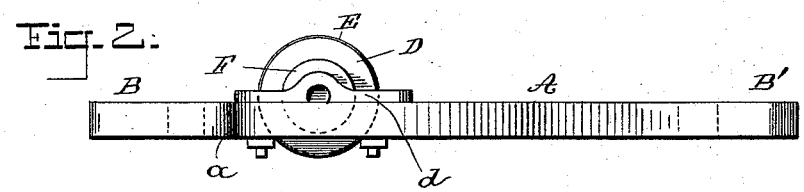
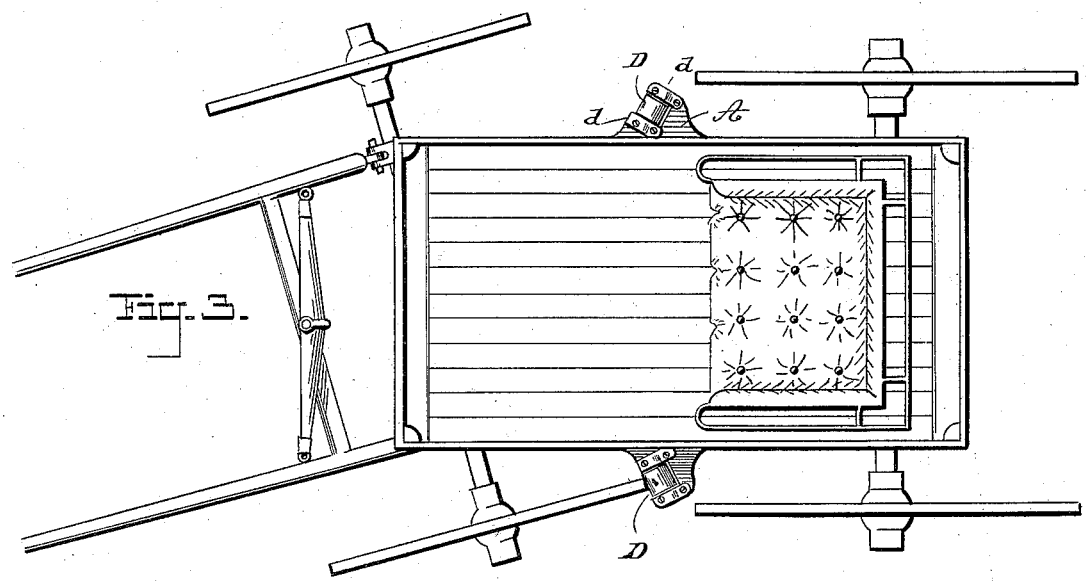
WITNESSES:
INVENTOR:
B. W. Beach
BY Munn & Co.
ATTORNEYS.

UNITED STATES PATENT OFFICE.

BURTON W. BEACH, OF CORNWALL, NEW YORK.

WEAR-PLATE FOR VEHICLES.

SPECIFICATION forming part of Letters Patent No. 365,960, dated July 5, 1887.

Application filed December 21, 1886. Serial No. 222,211. (No model.)

*To all whom it may concern:*

Be it known that I, BURTON W. BEACH, of Cornwall, in the county of Orange and State of New York, have invented a new and Improved Wear-Plate, of which the following is a full, clear, and exact description.

My invention relates to a wear-plate attachment for vehicles, and has for its object to provide a means whereby the forward wheels in turning sharply will not mar the body of a vehicle, and wherein the said wear-plate will also assist the aforesaid wheels in making such turn.

The invention consists in the construction and arrangement of parts, as will be hereinafter fully described and claimed.

Reference is to be had to the accompanying drawings, forming a part of this specification, in which similar letters of reference indicate corresponding parts in all the figures.

Figure 1 is a plan view of my attachment, and Fig. 2 is a side elevation thereof. Fig. 3 is a plan view illustrating my attachment applied to a vehicle.

In carrying out my invention I construct the wear-plate A of substantially a triangular shape, having its front edge, *a*, cut at an angle and provided with an integral ear, B, while the rear side, *b*, of said plate is cut away on an incline and curved inward, terminating in an ear, B', similar to and in the same plane with the aforesaid ear B. Each of said ears is provided with one or more apertures, *c*.

In the forward angular edge, *a*, of the wear-plate A, within a recess, A', formed therein, a roller, D, is journaled in a parallel line and flush with the said angular edge *a*, being held to turn therein by straps *d*, secured in any suitable manner to the upper face of the plate over the axis of the roller. The surface of the roller D, I usually cover with an elastic material, E, such as rubber, in order that a hard surface may not be presented to the tire, and also to prevent any unpleasant sound from their contact. The roller D may also be provided with a step or annular offset, F, at the ends thereof, of about half the circumference of the said roller, so that the wearing-surface will not extend to the bearings, thus obviating any tendency to choke, and also permitting any dirt or grit to pass off to the rear away from the bearings. The straps *d* may, if desired, be provided with oil-apertures *e*, whereby to lubricate the axis of the roller. The plates are usually secured beneath the vehicle-body by the ears B B', their forward edges being inclined rearward, so that as the forward wheels cramp the tire thereof will fairly bear upon the roller D.

Having thus fully described my invention, I claim as new and desire to secure by Letters Patent—

As an improved article of manufacture, a wear-plate for vehicles, comprising the plate A, of approximately triangular shape, having its front edge, *a*, cut at an angle and recessed at A', and the front and rear ears, B B', the roller D, having annular offsets F at its ends, a covering, E, of elastic material, and the straps secured to the plate at the ends of the recess A' and forming bearings for the axle of the roller, substantially as set forth.

BURTON W. BEACH.

Witnesses:
HENRY VAN DUZER,
WILLIAM M. HALLETT.